United States Patent
Ruffini

(10) Patent No.: US 6,711,411 B1
(45) Date of Patent: Mar. 23, 2004

(54) MANAGEMENT OF SYNCHRONIZATION NETWORK

(75) Inventor: Stefano Ruffini, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 09/706,727

(22) Filed: Nov. 7, 2000

(51) Int. Cl.⁷ ............................................. H04B 15/00
(52) U.S. Cl. ..................... 455/502; 455/428; 370/350; 370/355
(58) Field of Search ................. 455/502, 402, 455/418, 428–439, 26.1, 78, 560, 191.3, 445; 370/351, 355, 356, 357, 358, 360

(56) References Cited

U.S. PATENT DOCUMENTS

| | | | |
|---|---|---|---|
| 4,939,726 A | * | 7/1990 | Flammer et al. ............ 370/400 |
| 4,987,536 A | | 1/1991 | Humblet |
| 5,086,428 A | | 2/1992 | Perlman et al. |
| 5,128,926 A | | 7/1992 | Perlman et al. |
| 5,265,092 A | | 11/1993 | Soloway et al. |
| 5,398,317 A | | 3/1995 | Nugent |
| 5,453,977 A | * | 9/1995 | Flammer et al. ............ 370/254 |
| 5,687,168 A | | 11/1997 | Iwata |
| 5,805,593 A | | 9/1998 | Busche |
| 5,825,772 A | | 10/1998 | Dobbins et al. |
| 5,875,179 A | | 2/1999 | Tikalsky |
| 5,881,243 A | | 3/1999 | Zaumen et al. |
| 5,920,566 A | | 7/1999 | Hendel et al. |
| 5,964,841 A | | 10/1999 | Rekhter |
| 5,987,521 A | | 11/1999 | Arrowood et al. |
| 6,097,718 A | | 8/2000 | Bion |
| 6,198,728 B1 | * | 3/2001 | Hulyalkar et al. ........ 370/310.1 |
| 6,393,118 B1 | * | 5/2002 | Bhusri ........................ 379/219 |
| 2002/0193101 A1 | * | 12/2002 | McAlinden .................. 455/419 |

FOREIGN PATENT DOCUMENTS

| | | |
|---|---|---|
| WO | WO98/15077 | 4/1998 |
| WO | WO98/37651 | 8/1998 |

OTHER PUBLICATIONS

"Transmission and Multiplexing (TM); Synchronization Network Engineering," European Telecommunications Standard Institute (ETSI), ETSI EG 201 793 v1.1.1 (2000–10), pp. 1–86.

"Transmission and Multiplexing (TM); Generic Requirements of Transport Functionality of Equipment; Part 6–1: Sychronization Layer Functions, " European Telecommunication Standards Institute (ETSI), ETS 300 417–6–1, Aug. 1998, pp. 1–28.

"OSPF Version 2, " J. Moy, Ascend Communications, Inc., Apr. 1998, pp. 1–244.

"Definitions and Terminology for Synchronization Networks", ITU–T Recommendation G.810, Aug. 1996, pp. 1–20.

* cited by examiner

Primary Examiner—Congvan Tran

(57) ABSTRACT

Operation of a synchronization network that includes a number of nodes and reference clock distribution logic includes, at each of the nodes, storing a table that represents a most recent status of the synchronization network. Reference clocks are then distributed to each node in the synchronization network. If a change in synchronization status occurs at a node in the synchronization network, this change is detected. The table at the node is updated to represent an updated status of the synchronization network. Then, a synchronization network management protocol is used to distribute the updated status to other nodes in the synchronization network. Other nodes may change their status in response to receipt of the updated information, and information about these additional updates are distributed throughout the synchronization network in a similar manner, thereby facilitating control of the synchronization network.

24 Claims, 11 Drawing Sheets

| NETWORK ELEMENT | SYNCHRONIZATION FROM | PRIORITY | TRACEABLE TO | STATUS | SUPERVISION RESULT (MTIE, TDEV, FDEV, SSM, ETC.) |
|---|---|---|---|---|---|
| A | - | - | - | NETWORK PRC (G.811) | |
| B | A | 1 | A | LOCKED (G.811) | MTIE=.... |
| B | B (INTERNAL CLOCK) | 2 | B | STAND-BY (G.812) | MTIE=.... |
| C | B | 1 | A-B | LOCKED (G.811) | MTIE=.... |
| C | B | 2 | A-B | STAND-BY (G.811) | MTIE=.... |
| C | C (INTERNAL CLOCK) | 3 | C | STAND-BY (G.812) | MTIE=.... |
| D | B | 1 | A-B | LOCKED (G.811) | MTIE=.... |
| D | C | 2 | A-B-C | STAND-BY (G.811) | MTIE=.... |
| D | D (INTERNAL CLOCK) | 3 | D | STAND-BY (G.813) | MTIE=.... |
| E | D | 1 | A-B-D | LOCKED (G.811) | MTIE=.... |
| E | E (INTERNAL CLOCK) | 2 | E | STAND-BY (G.812) | MTIE=.... |
| F | E | 1 | A-B-D-E | LOCKED (G.811) | MTIE=.... |
| F | F (INTERNAL CLOCK) | 2 | F | STAND-BY (G.813) | MTIE=.... |
| G | F | 1 | A-B-D-E-F | LOCKED (G.811) | MTIE=.... |
| G | H | 2 | A-B-D-E-F-G-H | STAND-BY (G.811) | MTIE=.... |
| G | G (INTERNAL CLOCK) | 3 | G | STAND-BY (G.813) | MTIE=.... |

*FIG. 3A*

| NETWORK ELEMENT | SYNCHRONIZATION FROM | PRIORITY | TRACEABLE TO | STATUS | SUPERVISION RESULT (MTIE, TDEV, FDEV, SSM, ETC.) |
|---|---|---|---|---|---|
| H | G | 1 | A-B-D-E-F-G | LOCKED (G.811) | MTIE=... |
| H | I | 2 | A-B-D-E-F-G-H-L-I | STAND-BY (G.811) | MTIE=... |
| H | H (INTERNAL CLOCK) | 3 | H | STAND-BY (G.813) | MTIE=... |
| I | L | 1 | A-B-D-E-F-G-H-(I)-L | LOCKED (G.811) | MTIE=... |
| I | I (INTERNAL CLOCK) | 2 | I | STAND-BY (G.813) | MTIE=... |
| L | I (NON LOCKED, FROM H) | 1 | A-B-D-E-F-G-H-(I) | LOCKED (G.811) | MTIE=... |
| L | I (NON LOCKED, FROM F) | 2 | A-B-D-E-F-(I) | STAND-BY (G.811) | MTIE=... |
| L | L (INTERNAL CLOCK) | 3 | L | STAND-BY (G.812) | MTIE=... |
| ... | ... | ... | ... | ... | ... |

| NETWORK ELEMENT | SYNCHRONIZATION FROM | PRIORITY | TRACEABLE TO | STATUS | SUPERVISION RESULT (MTIE, TDEV, FDEV, SSM, ETC.) |
|---|---|---|---|---|---|
| A | - | - | - | NETWORK PRC (G.811) | |
| B | A | 1 | A | LOCKED (G.811) | MTIE = .... |
| B | B (INTERNAL CLOCK) | 2 | B | STAND-BY (G.812) | MTIE = .... |
| C | B | 1 | A-B | LOCKED (G.811) | MTIE = .... |
| C | B | 2 | A-B | STAND-BY (G.811) | MTIE = .... |
| C | C (INTERNAL CLOCK) | 3 | C | STAND-BY (G.812) | MTIE = .... |
| D | B | 1 | A-B | LOCKED (G.811) | MTIE = .... |
| D | C | 2 | A-B-C | STAND-BY (G.811) | MTIE = .... |
| D | D (INTERNAL CLOCK) | 3 | D | STAND-BY (G.813) | MTIE = .... |
| E | D | 1 | A-B-D | LOCKED (G.811) | MTIE = .... |
| E | E (INTERNAL CLOCK) | 2 | E | STAND-BY (G.812) | MTIE = .... |
| F | E | 1 | A-B-D-E | LOCKED (G.811) | MTIE = .... |
| F | F (INTERNAL CLOCK) | 2 | F | STAND-BY (G.813) | MTIE = .... |
| G | F | 1 | - | LOCKED (G.811) -> FAILURE | MTIE = .... ALARM |
| G | H | 2 | A-B-D-E-F-G-H | STAND-BY (G.811) | MTIE = .... |
| G | G (INTERNAL CLOCK) | 3 | G | STAND-BY -> LOCKED (G.813) | MTIE = .... |

Columns: 301, 303, 305, 307, 309, 311

FIG. 4A

| NETWORK ELEMENT (301) | SYNCHRONIZATION FROM (303) | PRIORITY (305) | TRACEABLE TO (307) | STATUS (309) | SUPERVISION RESULT (MTIE, TDEV, FDEV, SSM, ETC.) (311) |
|---|---|---|---|---|---|
| H | G | 1 | A-B-D-E-F-G | LOCKED (G.811->G.813) | MTIE=.... |
| H | I | 2 | A-B-D-E-F-G-H-(I)-L-I | STAND-BY (G.811) | MTIE=.... |
| H | H (INTERNAL CLOCK) | 3 | H | STAND-BY (G.813) | MTIE=.... |
| I | L | 1 | A-B-D-E-F-(I)-L | LOCKED (G.811) | MTIE=.... |
| I | I (INTERNAL CLOCK) | 2 | I | STAND-BY (G.813) | MTIE=.... |
| L | I (NON LOCKED, FROM H) | 1 | A-B-D-E-F-G-H-(I) | LOCKED -> STAND-BY (G.811 -> G.813) | MTIE= ALARM.... |
| L | I (NON LOCKED, FROM F) | 2 | A-B-D-E-F-(I) | STAND-BY -> LOCKED (G.811) | MTIE=.... |
| L | L (INTERNAL CLOCK) | 3 | L | STAND-BY (G.812) | MTIE=.... |
| ... | ... | ... | ... | ... | ... |

| NETWORK ELEMENT | SYNCHRONIZATION FROM | PRIORITY | TRACEABLE TO | STATUS | SUPERVISION RESULT (MTIE, TDEV, FDEV, SSM, ETC.) |
|---|---|---|---|---|---|
| A | - | - | - | NETWORK PRC (G.811) | |
| B | A | 1 | A | LOCKED (G.811) | MTIE = .... |
| B | B (INTERNAL CLOCK) | 2 | B | STAND-BY (G.812) | MTIE = .... |
| C | B | 1 | A-B | LOCKED (G.811) | MTIE = .... |
| C | B | 2 | A-B | STAND-BY (G.811) | MTIE = .... |
| C | C (INTERNAL CLOCK) | 3 | C | STAND-BY (G.812) | MTIE = .... |
| D | B | 1 | A-B | LOCKED (G.811) | MTIE = .... |
| D | C | 2 | A-B-C | STAND-BY (G.811) | MTIE = .... |
| D | D (INTERNAL CLOCK) | 3 | D | STAND-BY (G.813) | MTIE = .... |
| E | D | 1 | A-B-D | LOCKED (G.811) | MTIE = .... |
| E | E (INTERNAL CLOCK) | 2 | E | STAND-BY (G.812) | MTIE = .... |
| F | E | 1 | A-B-D-E | LOCKED (G.811) | MTIE = .... |
| F | F (INTERVAL CLOCK) | 2 | F | STAND-BY (G.813) | MTIE = .... |
| G | F | 1 | - | FAILURE | MTIE = .... ALARM |
| G | H | 2 | A-B-D-E-F-(I)-L-I-H | STAND-BY (G.811) -> LOCKED (G.811) | MTIE = .... |
| G | G (INTERNAL CLOCK) | 3 | G | LOCKED -> STAND-BY (G.813) | MTIE = .... |

Column labels: 301, 303, 305, 307, 309, 311

FIG. 5A

| NETWORK ELEMENT (301) | SYNCHRONIZATION FROM (303) | PRIORITY (305) | TRACEABLE TO (307) | STATUS (309) | SUPERVISION RESULT (MTIE, TDEV, FDEV, SSM, ETC.) (311) |
|---|---|---|---|---|---|
| H | G | 1 | G | STAND-BY (G.813) | MTIE = .... |
| H | I | 2 | A-B-D-E-F-(I)-L-I | STAND-BY -> LOCKED (G.811) | MTIE = .... |
| H | H (INTERNAL CLOCK) | 3 | H | STAND-BY (G.813) | MTIE = .... |
| I | L | 1 | A-B-D-E-F-(I)-L | LOCKED (G.811) | MTIE .... |
| I | I (INTERNAL CLOCK) | 2 | I | STAND-BY (G.813) | MTIE = .... |
| L | I (NON LOCKED, FROM H) | 1 | A-B-D-E-F-(I)-L-I-H-(I) | STAND-BY (G.811) | MTIE = .... |
| L | I (NON LOCKED, FROM F) | 2 | A-B-D-E-F-(I) | LOCKED (G.811) | MTIE = .... |
| L | L (INTERNAL CLOCK) | 3 | L | STAND-BY (G.812) | MTIE = .... |
| ... | ... | ... | ... | ... | ... |

FIG. 5B

MANAGEMENT OF SYNCHRONIZATION NETWORK

BACKGROUND

The invention relates to synchronization in telecommunication systems.

Digital communication networks often require a common timing reference to operate accurately. That is, the clocks in one node of the network should operate at the same speed as the clocks in other nodes of the network. Failure to provide synchronized clocks will lead to Jitter and Wander, which in turn can lead to such problems as transmission errors and buffer under/overflow. A network cannot maintain low error rates under such conditions, and ultimately may require some degree of unavailability to rectify the situation.

To provide for a common timing reference, digital communication networks include synchronization networks, whose job it is to ensure that a common timing reference is used throughout the network. One such synchronization network is described in European Telecommunication Standards Institute (ETSI) document European Guide (EG) 201 793 v1.1.1 (2000-10), entitled "Transmission and Multiplexing (TM); Synchronization Network Engineering", which is hereby incorporated herein by reference in its entirety. This document describes the various elements that make up a synchronization network, and the principles of operation by which such a network distributes accurate timing information from so-called Primary Reference Clocks (PRCs) to the clocks located in other pieces of equipment throughout the network. PRCs are the highest quality clocks in a network, and are usually based on a free-running Caesium Beam oscillator giving a very accurate clock performance.

FIG. 1 is a block diagram of an exemplary digital communication network 100 that includes a synchronization network. For purposes of illustration, the exemplary network 100 is a telecommunications network, and therefore includes, at network nodes, equipment that is well-known in the art. In the figure, transport links are indicated by solid lines, and synchronization reference links are shown by dashed lines that include an arrow at one end to indicate the source and recipient of the reference clock signal. Where a node has the possibility of receiving a reference clock from more than one source, primary reference links (i.e., those synchronization links that are preferred to be used for supplying a reference clock from one node to another) are denoted by the number "1" next to the dashed line indicating the link. Secondary reference links (i.e., those synchronization links that are used when the primary synchronization link is unavailable) are denoted by the number "2" next to the dashed line indicating the link.

The exemplary network 100 utilizes the Synchronous Digital Hierarchy (SDH), which is a standard technology for synchronous data transmission on optical media. It is the international equivalent of the Synchronous Optical Network (SONET). To facilitate the following discussion, the various nodes of the network are given reference characters A, B, C, D, E, F, G, H, I, L, M, and N.

In a fully synchronized network, all sources should be ultimately traceable to a PRC. In the exemplary network, this is the PRC A. The PRC A supplies its high quality clocking signal ("clock") to Stand Alone Synchronization Equipment (SASE) B. A SASE is a piece of synchronization equipment that contains a Synchronization Supply Unit (SSU), which is a high quality slave clock. The SASE B distributes its clock signal to a Digital Exchange C (which, in alternative embodiments, could be a Telephone Exchange) and also to an SDH multiplexer (MUX) D.

The SDH MUX D distributes its clock signal to an SDH Digital Cross Connect unit (SDH DXC) E, which in turn distributes its clock signal to an SDH Add Drop Multiplexer (ADM) F. The clock supplied by the SDH ADM F is then supplied to each of two more SDH ADMs G and I. The reference link between the SDH ADM F and the SDH ADM G is a primary link.

Rather than using the supplied clock signal itself, the SDH ADM I operates in a "bypass" mode (commonly named "NON-SETS locked", where "SETS" stands for "Synchronous Equipment Timing Source"), whereby the synchronization clock is merely forwarded directly to the SASE L. This is common when, for example, the ADM and SASE are implemented in the same building. Essentially, the SASE L is the real recipient of the synchronization clock supplied by SDH ADM F, and this clock is treated as a secondary link. In the exemplary embodiment, the SASE L's primary link is supplied (through the SDH ADM I operating in "bypass" mode) by an SDH ADM H.

Despite its bypass function, the SDH ADM I does require a synchronization clock, and in the exemplary embodiment this is supplied by the SASE L.

The SDH ADM I supplies its synchronization clock to the SDH ADM H, and this is treated as a secondary link. The SDH ADM H's primary link is supplied by the SDH ADM G. To permit reconfigurability, the SDH ADM H is also coupled to supply a synchronization clock to the SDH ADM G, and this is treated as a secondary link by the SDH ADM G.

In accordance with the exemplary embodiment, the SDH ADM H also supplies a synchronization clock to a digital switch M, which also receives a synchronization clock from the digital switch N. The remainder of the exemplary network is not shown, since this is not important to understanding the invention.

It is very important that the synchronization network be planned in such a way so as to avoid the occurrence of timing loops, both during normal operation as well as when a malfunction prevents one or more nodes from supplying their reference clocks to their planned recipient nodes. A timing loop is created when a clock is directly or indirectly synchronized to itself. In a timing loop situation, all the clocks belonging to the loop can show a large frequency offset compared to nominal frequency and are likely to be isolated from the rest of the synchronization network. To avoid timing loops, elements in a ring should be provided with means that enable the possible generation of timing loops to be discovered. Such elements are usually connected such that they each have at least two synchronization sources, so that when one source is discovered to cause a timing loop, there is at least the possibility of avoiding it by selecting one of the alternative sources. For example, suppose that the reference link between nodes F and G is cut. In this situation, the SDH ADM G will respond by looking to node H to supply the necessary reference clock. However, under normal circumstances, node H expects to receive its reference clock from node G. It is apparent that a timing loop will occur here unless node H also responds to the break between nodes F and G by looking to another source for its reference clock. It is important that the clock supplied by this alternative source also not ultimately be derived from the clock at node G or from the clock at node H in order to avoid a timing loop.

In SDH networks, the use of Synchronous Status Messages (SSMs) provides some help with avoiding timing loops. An SSM is a signal that is passed over a synchronization interface to indicate the Quality-Level of the clock that the interface is ultimately traceable to; that is, the grade-of-clock to which it is synchronized directly or indirectly via a chain of network element clocks (the "synchronization trail"), however long this chain of clocks is. In a fully synchronized network, all sources should ultimately be traceable to a PRC, and there is a predefined code to indicate this. Another code, "Do Not Use for Synchronization", is used to prevent timing loops and is transmitted in the opposite direction on interfaces used to synchronize an equipment's clock.

Although the SSM algorithm is a good concept in some applications like SDH or SONET rings, it is unable to guarantee that all timing loops will be prevented, because it only provides information about the quality of the traceable synchronization reference source, but not information about the actual physical source. See, for example, chapter 4.13 of ETS 300 417-6-1, "Generic requirements of transport functionality of equipment: Synchronization layer function", which is hereby incorporated herein by reference in its entirety. Another drawback of the SSM algorithm is that it is often not supported by SASE or by Network Elements other than SDH/SONET Network elements (i.e., it can only be used between SDH/SONET Network Elements).

It is noted that timing loops can cause severe disturbances in the traffic network, but that the effect of these disturbances ver seldom gives a readily discernable indication of where the failure in the synchronization network occurred. It is therefore important to provide effective ways for managing synchronization networks so that, when failures occur in the network, it can be determined how to rearrange the network to maintain an acceptable quality of synchronization without creating timing loops.

Today, the management of synchronization networks is distributed among several platforms. The reason for this is that a synchronization network very often consists of different types of equipment that can be either dedicated to synchronization (e.g., SASE), or to both synchronization and traffic (e.g., and SDH multiplexer or a digital switch). As a result, several management systems (e.g., one for the SASE network, one for the SDH equipment, one for the switching network, etc.) have to be maintained in parallel. This situation is illustrated in FIG. 1, in which a first Switching Network Management Network 101 manages the Digital Exchange at node C; a SASE Management Network 103 manages the SASE at nodes B and L; a first SDH Management Network 105 manages the SDH Mux at node D, the SDH DXC at node E, and the SDH ADMs at nodes F and I; a second Switching Network Management Network 107 manages the Digital Switches at nodes M and N; and a second SDH Management Network 109 manages the SDH ADMs at nodes G and H. This situation is not unrealistic, since the "same" type of equipment (e.g., an SDH ADM) may be manufactured by different vendors who design their equipment using incompatible equipment management strategies. Such equipment may, nonetheless, be connected together in a single network to achieve diverse goals, such as supporting mobile network functions on the one hand, and hard-wired telephone functions on the other.

This problem of distributed management will only get worse in the future as new types of equipment (e.g., Internet Protocol (IP) routers) increase their synchronization function (due to new network application of this equipment), which will in turn require that this new equipment be managed from a synchronization perspective.

The above describes the best case situation of the conventional synchronization management approach. In practice, the network management of synchronization networks more often does not exist, or is incomplete. Because of this, conventional synchronization networks not only have to be well planned, but also need to be continuously maintained by maintenance personnel who may need to be physically present at the numerous sites. In most cases, this physical presence at each site is impossible due to geographical distribution of the synchronization network.

For the above reasons, it is very difficult for an operator of a conventional system to have full control and visibility of the synchronization network. Better synchronization management techniques and systems are therefore desired.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a synchronization network that includes a plurality of nodes and logic that distributes reference clocks to each of the nodes. Operation of the synchronization network includes, at each of the nodes, storing a table that represents a most recent status of the synchronization network. A change in synchronization status at a first node in the synchronization network is detected, and at the first node, the table is updated to represent a first updated status of the synchronization network. A synchronization network management protocol is then used to distribute the first updated status to other nodes in the synchronization network. In this way, each node in the synchronization network can have complete information about the most recent status of the synchronization network, thereby facilitating management of the network.

In another aspect of the invention, one or more other nodes may change their own status in response to receipt of information identifying a change in status at another node. By similarly updating their own tables and using the synchronization network management protocol to distribute the updated status to other nodes in the synchronization network, an iterative process is used that results in each node in the synchronization network having the most recent status about the synchronization network.

In some embodiments, the synchronization network may include an integrated synchronization network management node that also receives the synchronization network status information, and uses this to control all of the nodes in the synchronization network.

BRIEF DESCRIPTION OF THE DRAWINGS

The objects and advantages of the invention will be understood by reading the following detailed description in conjunction with the drawings in which:

FIGS. 3a and 3b together make up an exemplary table that, in accordance with the invention, corresponds to the Synchronization Network 200;

FIGS. 4a and 4b together make up an exemplary updated table 300' that, in accordance with the invention, corresponds to the Synchronization Network 200 after a malfunction has occurred between nodes F and G;

FIGS. 5a and 5b together make up an exemplary table 300" that, in accordance with the invention, corresponds to the Synchronization Network 200 after reconfigurations have been made to accommodate the malfunction that occurred between nodes F and G;

DETAILED DESCRIPTION

Figure 1:
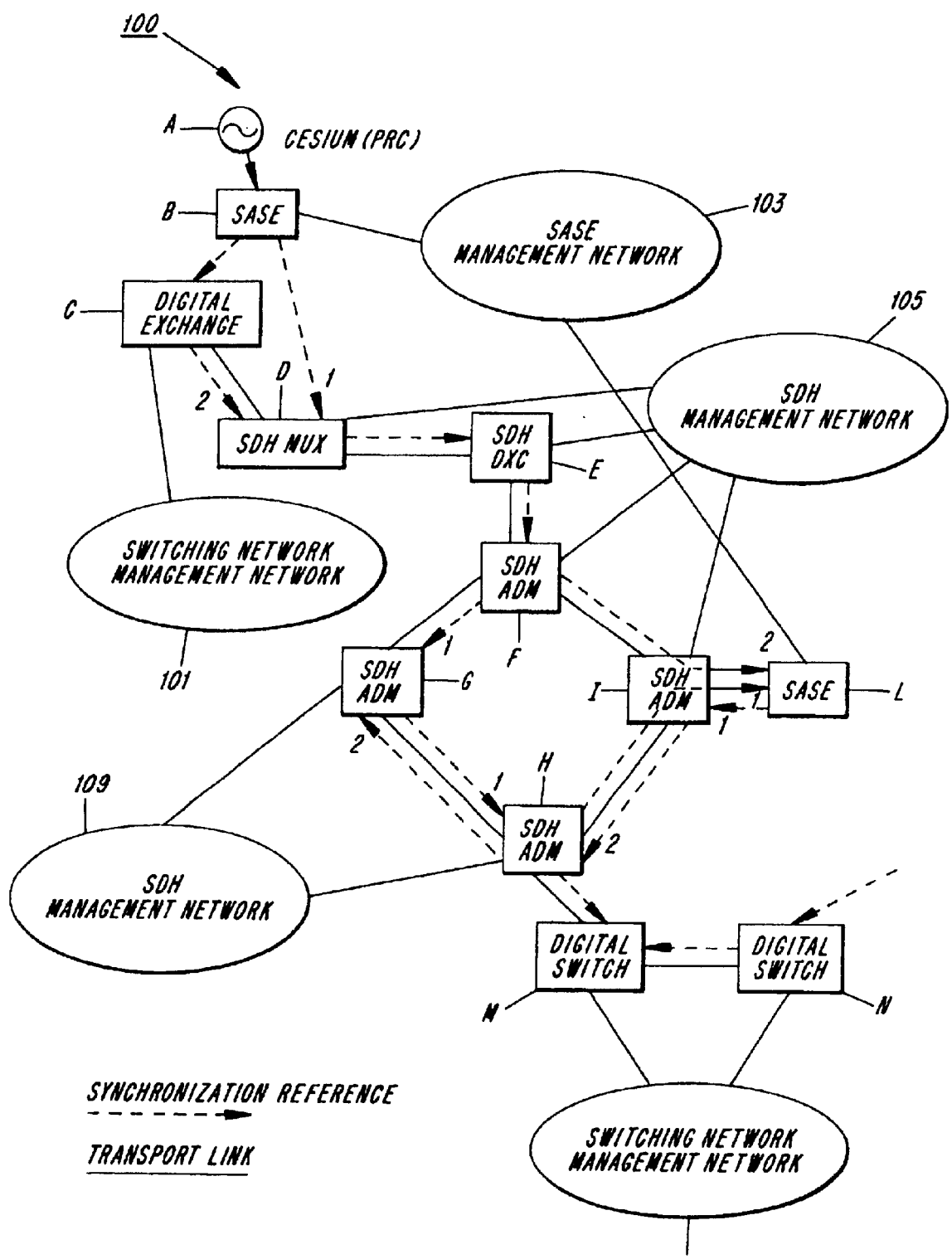
FIG. 1 is a block diagram of an exemplary digital communication network 100 that includes a synchronization network.

The various features of the invention will now be described with respect to the figures, in which like parts are identified with the same reference characters.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Considered at a high level, the invention involves the use of node addresses and a suitable protocol for providing the equipment at each node of the synchronization network with a complete description of the dynamic status of the synchronization network at any point in the network. This same information can then be made available in a central management center. In this way, decisions regarding any necessary network rearrangement in case of failures can be made autonomously by the equipment at any node, or alternatively can be made by the equipment at a central management center.

An exemplary embodiment of the invention will now be described in greater detail using principles that are known in connection with link state routing protocols such as the Open Shortest Path First (OSPF) data routing protocol. These principles can be advantageously applied in the present invention relating to synchronization network management because they provide for fast reaction in case of changes in network topology, small overhead traffic, and flexibility in rearranging the network based on proper optimization algorithms.

This is not to be understood to mean that the conventional link state routing protocols are useful for managing synchronization networks—they are not since, for example, they do not provide for the exchange of data pertinent to the synchronization network management functions (e.g., data pertaining to synchronization trails and status). However, the OSPF routing protocol enables all routers in an IP network to have a complete picture of the IP network for purposes of being able to route each data packet from its source node to its intended destination node, and it will now be described how, in accordance with the invention, these concepts are usefully applied in a new way to facilitate the management of synchronization networks.

In OSPF, providing all routers with a complete picture of the IP network is accomplished by having each router send updates of its link state (i.e., information about changes in the status of connected links) to other neighboring routers in the IP network. In a recursive way, the same information is spread throughout the network, until each router has the information, and can create a complete picture of the IP network that can be used in the routing of IP packets.

In accordance with the invention, a similar approach is used in Synchronization Networks to provide each node in the Synchronization Network with complete information about the link status of all of the other nodes in the Synchronization Network. To do this, the information needed is:

The active synchronization reference and its status (that is, the identity of the traceable synchronization source and its quality; and The identities of the stand-by (back-up) synchronization references and their status.

Figure 2:
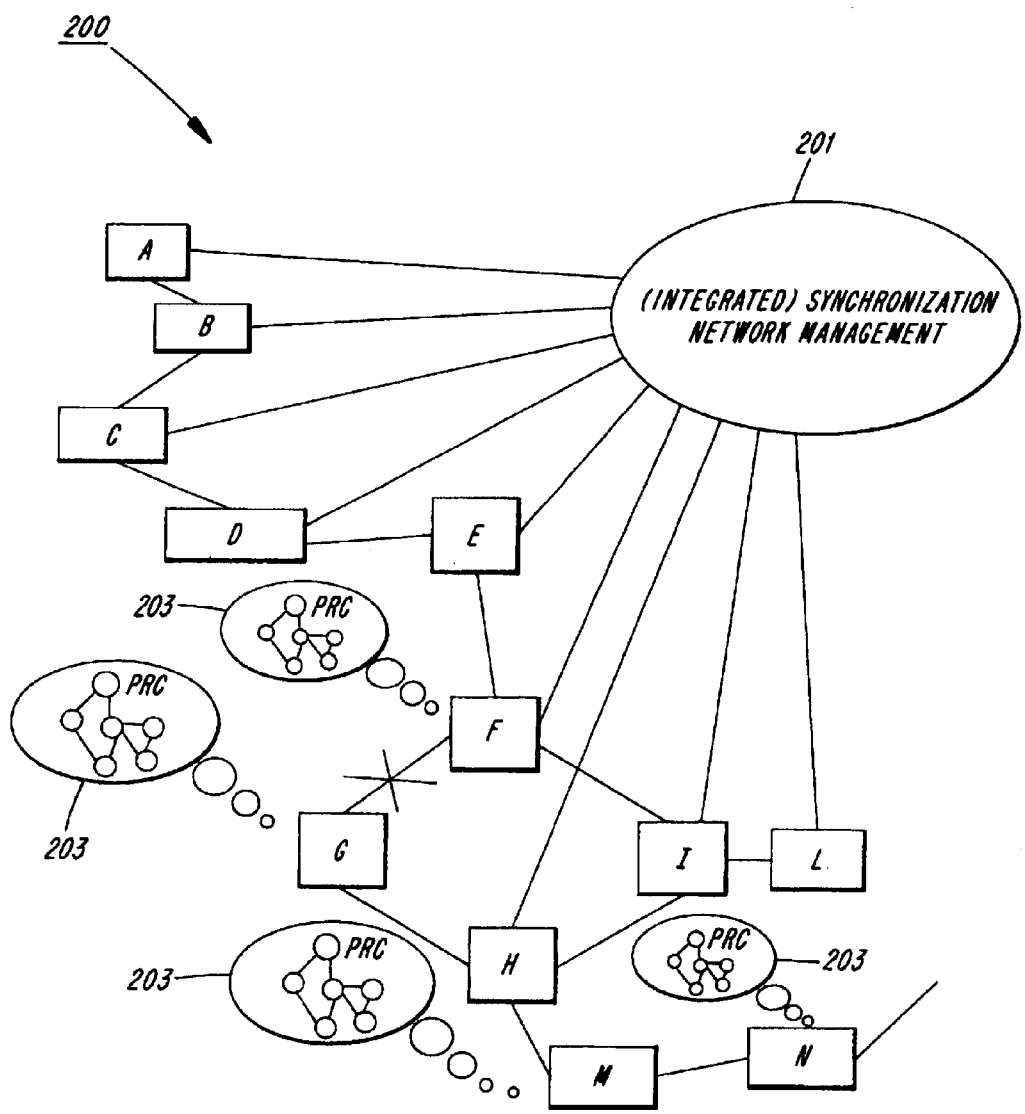
FIG. 2 is a block diagram of an exemplary synchronization network having a centralized control mechanism in accordance with the invention.

FIG. 2 is a block diagram of an exemplary synchronization network 200 having a centralized control mechanism in accordance with the invention. To facilitate a comparison between the invention and conventional synchronization network management techniques, the synchronization network 200 comprises nodes, denoted A, B, C, D, E, F, G, H, I, L, M, and N, that are nominally linked together in the same configuration as that of the synchronization network 100 depicted in FIG. 1. The synchronization network 200 differs from a conventional network, however, in that it further includes, at each node, the ability to route synchronization link state information throughout the synchronization network 200, so that each node in the synchronization network 200 maintains complete information about the dynamic link status of the synchronization network 200 at any point in the network. In this exemplary embodiment, the synchronization network 200 further includes an Integrated Synchronization Network Management Network 201 that is capable of managing all of the nodes in the synchronization network. Provision of an Integrated Synchronization Network Management Network 201 is not essential to the invention, since as explained above, this function can alternatively be distributed among the various nodes, which each have complete information about the dynamic link status of the synchronization network 200.

In one aspect of the invention, each node in the Synchronization Management Network 200 is assigned an address (e.g., an IP address) that uniquely identifies that node. For purposes of convenience, the reference characters A, B, C, D, E, F, G, H, I, L, M, and N, that are used herein to denote the nodes, will also be used herein to represent the respective addresses of those nodes.

In the exemplary embodiment, the equipment at each node has an interface that is capable of supporting IP, and all such equipment is connected to an IP network. It is emphasized, however, that the use of IP standards is not essential to the invention, and that other telecommunication protocol standards could be substituted therefor, so long as those other protocols permit the communication of information between nodes as described below.

In another aspect of the invention, each node further has a storage device that stores a table that defines the relationship between each node and other physical links in the Synchronization Network 200. In FIG. 2, this is represented schematically by the several configuration information diagrams 203.

FIGS. 3a and 3b together make up an exemplary table 300 that corresponds to the Synchronization Network 200. In a first column 301 of the table 300, each of the nodes in the Synchronization Network 200 is defined. For each of these nodes, an entry in a second column 303 of the table 300 identifies the node's source of synchronization. For example, node A is a PRC (refer to FIG. 1), and thus has no other source. Node B has a link to receive synchronization from node A, and this is indicated in the second column 303. Moreover, for node B this is the preferred source of synchronization, so in a third column 305 of the table 300, there is an indication that this source is to be given highest priority (e.g., priority "1").

Many nodes have more than one possible source of synchronization. For example, node B has a link to receive synchronization from node A, as indicated above, but also has an internal clock that it can alternatively use as a synchronization reference. Each of these is assigned a relative priority that indicates an order of preference of use of these possible synchronization sources. So, for example, node B's highest priority synchronization reference is received from node A, and its next highest priority synchronization reference (in this case, priority "2") comes from node B's own internal clock.

A fourth column 307 in the table 300 indicates the succession of nodes through which the synchronization reference can be traced. For example, node A is a PRC, so there are no nodes through which its synchronization reference is derived. For node B, the synchronization reference is traceable to node A when the highest priority reference (i.e., the one provided by node A) is used, and alternatively traceable to B itself when B's own internal clock is used.

A fifth column 309 indicates, for the network element, the status of the corresponding synchronization reference. Possible states include: "Network PRC (G.811)"; "locked (G.811)"; "stand-by (G.812)"; and "stand-by (G.813)", the latter being a lower quality clock than that defined by G.812. These states are well-known in the art, and are defined, for example, in ITU-T recommendation G.811 (2/97), "Timing characteristics of Primary Reference Clocks"; and ITU-T recommendation G.812 (2/97), "Timing characteristics of Slave Clocks"; and ITU-T recommendation G.813 (8/96), "Timing characteristics of SDH Equipment Slave-Clocks (SEC)", all of which are hereby incorporated herein by reference in their entireties.

Finally, a sixth column 311 in the table 300 indicates a Supervision Result, such as: Maximum Time Interval Error (MTIE), Time Deviation (TDEV), Frequency Deviation (FDEV), Synchronization Status Message (SSM), and the like. These Supervision Results are the result of usually periodical supervision, and are set by the routine in the network element performing the supervision tests. These results may be read by the operator to check the quality of a synchronization network, but may also be used by the synchronization network in an automatic manner in order to reconfigure the synchronization network (e.g., in case a link exhibits poor quality). The Supervision Results MTIE and TDEV are well known in the art, and are defined in ITU-T recommendation G.810 (5/96), "Definitions and terminology for synchronization networks", which is hereby incorporated herein by reference in its entirety. The Supervision Result SSM is also well known and is defined in the above-referenced ETSI document EG 201 783. Frequency Deviation is also a well-known concept, and need not be defined here.

In order to avoid excessively large tables, the synchronization network can optionally be divided up into parts, with each part containing only data for a related subset of the entire synchronization network.

The discussion will now focus on how the contents of the table are modified in the event of a failure in the synchronization network. Suppose that a malfunction (e.g., a break in a cable) occurs that renders the synchronization link between nodes F and G inoperative. This means that node G will have to obtain synchronization from another source, and in order to avoid timing loops, other nodes may need to be reconfigured as well. In accordance with an aspect of the invention, this effort is coordinated by utilizing the new protocol (described in greater detail below) to distribute table updates, so that each node (including the one associated with the Integrated Synchronization Network Management network 201) will have complete information upon which to base reconfiguration decisions. The information changes piece-wise, so a number of updated tables are created and distributed in succession.

For example, after detecting the loss of its synchronization source, node G would examine its own table and discover that it cannot immediately select to receive its synchronization reference from node H, since this would cause a timing loop. (The table shows that the node H's source is traceable to node G.) So, node G opts instead to receive its synchronization reference from its own internal clock.

Node G updates the table 300 to reflect this change, and distributes it to the other nodes in the synchronization network. As the table is distributed from node to node, changes are made in a piecemeal fashion to adjust to the previous changes. FIGS. 4A and 4B illustrate an intermediate state of the table 300' after it has been updated to reflect several changes. In particular, a Supervision Result indicating "ALARM" has been generated in Node G as a result of the supervisor detecting something not working, such as Loss of Frame, or MTIE exceeding a certain threshold. This "ALARM" in turn causes Node G's highest priority link to transition from a "locked" state to a "FAILURE" state (the "–>" sign in the table indicates a transition from one state to another). In response to this failure, Node G's third priority synchronization reference source is now shown as transitioning from a "standby" mode to a "locked" state (meaning that it is being used by node G). This highlights the fact that in the reference selection algorithm, the condition of avoiding timing loops is given greater importance than choosing the reference having the highest priority. At this stage of the reconfiguration, node H is still receiving its synchronization reference from node G, but its table entries change to show a transition in quality from a G.811 quality reference to a G.813 quality reference. Another intermediate change reflected in the table 300' is exemplified by the entry for Node L, which also shows a Supervision Result of "ALARM" because the reference clock from node G is in the traceback path of Node L's primary synchronization source. In response, Node L has reconfigured itself to select the reference clock from its secondary source, Node I (operating in bypass mode to pass along the reference clock from node F). This is shown in the table 300' as the priority 1 source transitioning from a "locked" to a "standby" mode, and the priority 2 source transitioning from a "standby" to "locked" mode.

Some time later, the table 300" will look as shown in FIGS. 5A and 5B: At this point, node H has chosen to receive its synchronization reference from its second highest priority link, since this provides a better quality than the synchronization reference being supplied by node G. This is shown in the table 300" as a transitioning from a "standby" state to a "locked" mode of operation. Node G, in turn, chooses to receive the synchronization reference coming from node H, since this is a higher quality reference than its own internal clock, and because this can now be done without the risk of creating timing loops: This is shown in the table 300" as node G's priority 2 reference source transitioning from "standby" to "locked" mode, while the priority 3 reference source transitions from a "locked" mode to a "standby" mode.

Note that node G's synchronization reference from node H is no longer derived from node G. Note also that, for Node L, the highest priority reference clock source is no longer traceable through G, but is traceable to Node L itself. This could create a timing loop if Node L were to select this as the source. However, as shown in the table 300", Node L is receiving its reference clock from its secondary source, which does not suffer from this problem.

The table 300" shown in FIGS. 5A and 5B is not the final one in this iterative updating process, since the changes shown in this table will in turn cause entries for other nodes to change. For example, after node G has completed its transition from use of its internal clock (priority 3) to use of the reference clock from node H, the "traceable to" entry for node H, priority 1, should be updated to show a chain of nodes that includes node "H". To avoid cluttering the description with unnecessary details, these and other subsequent changes are not shown or described here further.

It is noted that each node can now make its own reconfiguration decisions automatically without any reliance on the conventional SSM algorithm, simply by relying on its own database which now reflects the most recent state of the synchronization network.

In another aspect of the invention, changes in synchronization status at a node cause the updated table to be propagated throughout the network. This may happen for a while without any changes in synchronization source being changed by any of the nodes. (Alternatively, nodes can be designed to respond immediately to information that indicates that one of the nodes in the succession of nodes through which the synchronization reference can be traced has experienced a failure.) Ultimately, the table with the changed status information makes its way to the Integrated Synchronization Network Management Network 201 (assuming that one is provided in the embodiment). The Integrated Synchronization Network Management can then take appropriate steps to work around the synchronization failure.

In yet another aspect of the invention, to route the table 300 throughout the synchronization network, a new protocol, herein referred to as Synchronization Network Management Protocol (SYNMP), is used.

Figure 6:
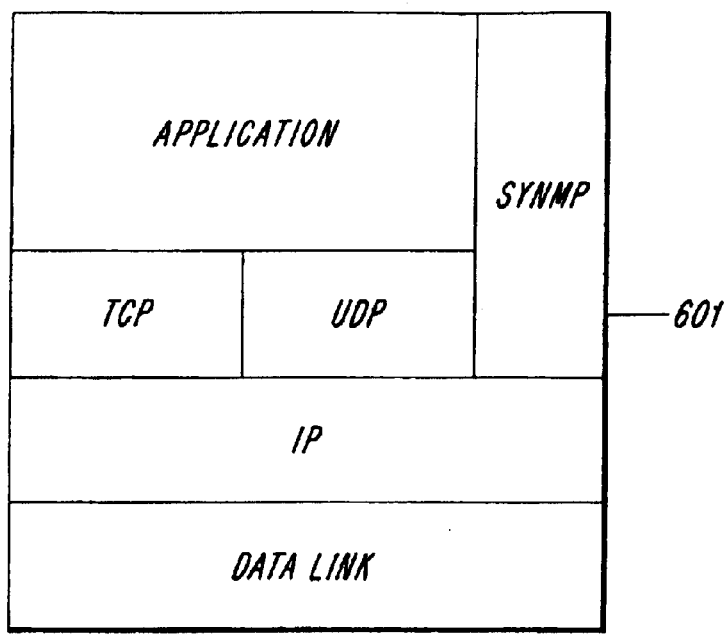
FIG. 6 is a diagram of a protocol stack that illustrates the relationship between SYNMP and other protocol layers including IP, in accordance with the invention.

The SYNMP protocol may have a similar approach as that used in the Link State routing protocol (e.g., OSPF, which is a well-known protocol for distributing routing information to all routers in a network, and for deciding the best routing to use). FIG. 6 is a diagram of a protocol stack that illustrates the relationship between the SYNMP protocol 601 and other protocol layers including IP. Like OSPF, the new SYNMP protocol 601 would be defined to operate directly over IP. However, unlike OSPF, instead of routing data, the new SYNMP protocol 601 transfers information that makes it possible for each node of the synchronization network (as well as at a centralized Synchronization Network Management center 201) to get information regarding synchronization trails and status. With this information, the network element is able to find the best alternative synchronization sources without the risk of creating timing loops and in accordance with the synchronization network plan.

Of course, dynamic modifications to the synchronization network plan can be made by personnel operating at, for example, the centralized Synchronization Network Management center 201. However, in alternative embodiments of the invention, the operation of the synchronization network can be made completely automated. For example, each network element might choose the most convenient reference based on an algorithm that satisfies one or more criteria, such as minimizing the length of trails, or providing good reliability (e.g., based on geographical diversity).

The following types of packets are defined in an exemplary embodiment of the SYNMP protocol 601:

"Sync Hello" packet: This packet periodically informs the connected nodes of the sender's synchronization status. In practice, the time interval between transmissions of this packet can be relatively high (e.g., on the order of hours) because the stability of network elements in a telecommunication network is relatively high (relative to network elements in datacom networks).

"Sync Database Description" packet: This packet may be used in an initializing phase to send information about active and stand-by synchronization references and their quality status (e.g., as a result of MTIE/TDEV supervision). A "Sync Database Description" packet is sent back as acknowledgment.

"Sync Link State request": This packet is used when synchronization data is to be updated, such as after the "Sync Database Description" exchange, in case part of the database is found to be out of date.

"Sync Link State Update": This packet may be sent to inform other nodes of changes in the synchronization references state (e.g., after failures). It may be sent autonomously by the node when it detects the changes in its own status. Alternatively, the "Sync Link State Update" packet may be sent by the node in response to receipt of a "Sync Link State request" packet from another node.

"Sync Link state Acknowledgment": This packet may be used to acknowledge receipt of a "Sync Link State Update" packet.

In addition to the above packet types, the protocol should provide a mechanism for communicating specific commands that determine remote configuration and operation of the synchronization function of the equipment. These commands would be used by an operator at a remote centralized location to manage the entire synchronization network. Exemplary commands include, but are not limited to:

a command to set which reference should be accepted as a synchronization reference;

a command to set the priorities for the different synchronization references;

one or more commands to set the alarm thresholds for the supervision parameters.

Figure 7:
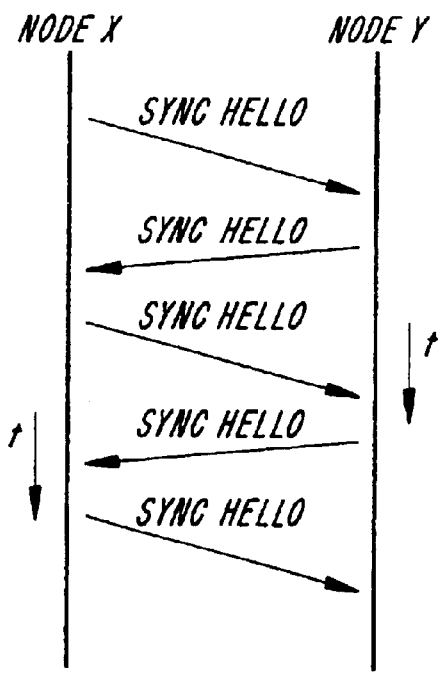
FIG. 7 is a timing diagram that illustrates the periodic exchange of "Hello" packets between two nodes X and Y, in accordance with an aspect of the invention.

FIGS. 7–11 are timing diagrams showing examples how a number of the above-described packets are exchanged in accordance with the SYNMP protocol defined by the invention. FIG. 7 is a timing diagram that illustrates the periodic exchange of "Sync Hello" packets between two nodes X and Y. As explained above, each "Sync Hello" packet may include information about the synchronization status of the sending node.

Figure 8:
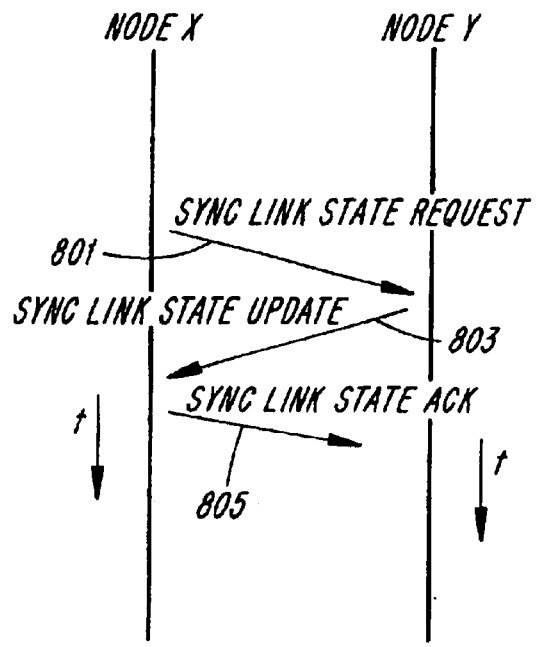
FIG. 8 is a timing diagram that illustrates a situation in which a node X requests, and subsequently receives, up-to-date synchronization status information about another node Y in the synchronization network.

FIG. 8 is a timing diagram that illustrates a situation in which a node X requests, and subsequently receives, up-to-date synchronization status information about another node Y in the synchronization network. To accomplish this, node X first sends a Sync Link State Request packet 801 to node Y. In response, node Y sends the requested information to node X by means of a Sync Link State Update packet 803. To complete this transaction, Node X then acknowledges receipt of the Sync Link State Update packet 803 by sending a Sync Link State Acknowledge packet 805 to node Y.

Figure 9:
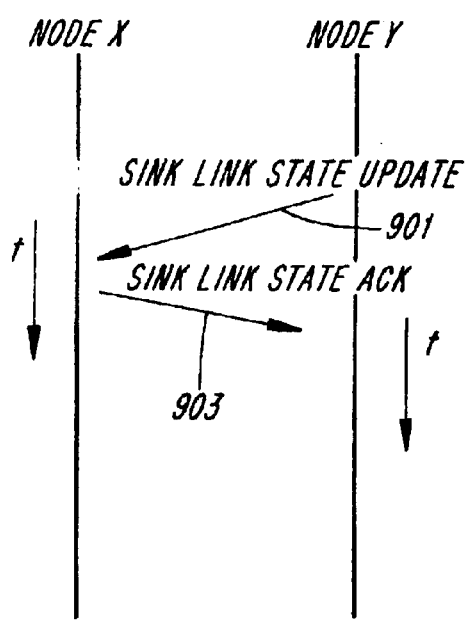
FIG. 9 is a timing diagram that illustrates a situation in which a node Y detects a change in its own status, and informs another node X of this information.

FIG. 9 is a timing diagram that illustrates a situation in which a node Y detects a change in its own status, and informs another node X of this information. In particular, node Y communicates the up-to-date synchronization status information to node X by means of a Sync Link State Update packet 901. To complete this transaction, Node X then acknowledges receipt of the Sync Link State Update packet 901 by sending a Sync Link State Acknowledge packet 903 to node Y.

Figure 10:
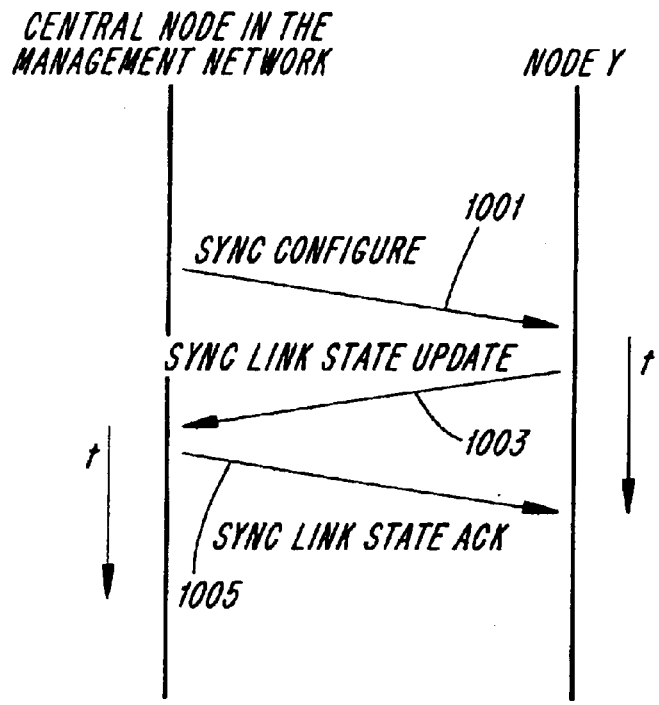
FIG. 10 is a timing diagram that illustrates how a central node in the management network uses the new SYNMP protocol to configure another node (node Y) in the synchronization network.

FIG. 10 is a timing diagram that illustrates how a central node in the management network uses the new SYNMP protocol to configure another node (node Y) in the synchronization network. First, a packet that includes suitable synchronization configuration commands 1001 is sent from the central node to the node Y. Node Y carries out the commanded reconfiguration (not shown). This reconfiguration results in a synchronization status change at node Y, which is reflected as an update to node Y's table 300. Accordingly, node Y communicates its most up-to-date synchronization status information to the central node by means of a Sync Link State Update packet 1003. To complete this transaction, the central node then acknowledges receipt of the Sync Link State Update packet 1003 by sending a Sync Link State Acknowledge packet 1005 to node Y.

Figure 11:
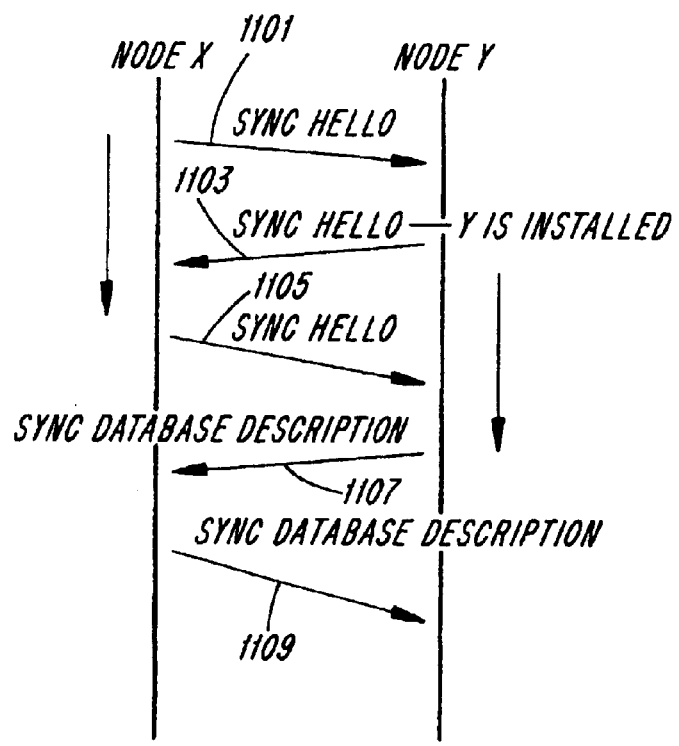
FIG. 11 is a timing diagram that illustrates how two nodes can synchronize their databases by means of the inventive SYNMP protocol.

FIG. 11 is a timing diagram that illustrates how two nodes can synchronize their databases by means of the inventive SYNMP protocol. In the example, a node X sends out a Sync Hello packet 1101 as part of its normal functioning. Sometime later, a different node, node Y, is installed. Node Y sends out its own Sync Hello packet 1103 as part of its normal functioning. Node X receives node Y's Sync Hello packet, and now sends out its own Sync Hello packet 1105 to node Y. In response to receipt of node X's Sync Hello packet 1105, node Y sends a Sync Database Description packet 1107 to node X. The Sync Database Description packet 1107 includes information about node Y's active and stand-by synchronization references and their quality status. Node X uses this information to update its own table 300. Finally, Node X acknowledges receipt of node Y's Sync Database Description packet 1107 by sending a Sync Database Description packet 1109 back to node Y.

FIG. 12 is a flowchart illustrating, at a high level, steps that are performed in operating the synchronization network in accordance with the invention. First, the tables in each node are initialized (using the new SYNMP protocol 601) to reflect the initial state of the synchronization network (step 1201). Each node (including the Integrated Synchronization Network Management node, if one is included in the embodiment) now has a complete picture of how reference clocks are propagated throughout the network.

Next, the synchronization network is operated, using well-known techniques, to distribute synchronization reference clocks to each node (step 1203). So long as there are no problems or other changes ("NO" path out of decision block 1205) this continues indefinitely. However, whenever a change in status occurs at a node ("YES" path out of decision block 1205), the table in the affected node is updated (step 1207). The new SYNMP protocol 601 is then used to propagate this information to all other nodes in the synchronization network, including the Integrated Synchronization Network Management node, if one is included in the embodiment (step 1209). The Sync Link State Update packet can be used for this task.

As updated information is propagated throughout the synchronization network, one or more nodes may respond with their own changes in status/configuration, therefore requiring further updates to the tables 300. Thus, through well-known iterative techniques, the new SYNMP protocol 601 is used to propagate the further updated information to all other nodes in the synchronization network, including the Integrated Synchronization Network Management node, if one is included in the embodiment (step 1211).

Eventually, no further changes are made at any nodes, and each node again has a complete picture of how reference clocks are propagated throughout the network. The synchronization network can then again be operated, using well-known techniques, to distribute synchronization reference clocks to each node (step 1203).

The above described techniques make it possible to completely integrate all of the synchronization network management functions into a single (centralized) node. This is especially important now that new types of equipment (IP routers in particular) are starting to need to be controlled by a Synchronization Network Management Network as well.

The above described techniques provide an additional advantage in that they make it possible to completely automate the planning and dynamic modification of the synchronization network. For example, a suitable algorithm for automatically planning a synchronization network might be based on such considerations as shortest paths, quality or reliability. Automatic decisions are advantageous because they can be made in a very short period of time, especially considering that, in accordance with the invention, any change in the synchronization network will be very quickly made visible at any point in the network.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, an exemplary embodiment of the Synchronization Network Management Protocol has described that includes a number of exemplary packet and command types that can be exchanged between nodes in a synchronization network to provide each node in the synchronization network with most recent information describing the synchronization routing through the network. It should be understood, however, that the exemplary packet and command types are not essential to the invention, but rather are presented merely to illustrate one possible embodiment of the protocol. Alternative embodiments, employing other packet types and/or command types, are also considered to be within the scope of the invention, so long as those other packet types and/or command types are designed for use in distributing synchronization-related information throughout a synchronization network.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a synchronization network that includes a plurality of nodes, wherein reference clocks are distributed to each node in the synchronization network, the method comprising:

at each of the nodes, storing a table that includes a most recent status of the synchronization network, said network synchronization status including, for all of the nodes in the network, information indicating a primary synchronization reference for each node, whether each node has one or more secondary synchronization references, a priority indication for each of the synchronization references for each node, succession of nodes through which each synchronization reference can be traced from each node to the reference, and an indication of which reference is currently being used by each node;

detecting a change in synchronization status at a first node in the synchronization network;

at the first node, updating the table to represent a first updated status of the synchronization network; and using a synchronization network management protocol to distribute the first updated status from the first node to other nodes in the synchronization network.

2. The method of claim 1, further comprising:

at a second node in the synchronization network, changing the synchronization information for the second node in response to receiving the first updated status generated by the first node;

at the second node, updating the table to include a second updated status of the synchronization network; and using the synchronization network management protocol to distribute the second updated status from the second node to other nodes in the synchronization network.

3. The method of claim 1, further comprising:

receiving the first updated status in an integrated synchronization network management network node;

generating by the integrated synchronization network management network node, one or more synchronization network control commands in response to the first updated status; and using the synchronization network management protocol to distribute the one or more synchronization network control commands from the integrated synchronization network management network node to one or more targeted nodes in the synchronization network.

4. The method of claim 1 wherein the table includes a supervision result for each node in the network, said supervision result indicating a quality level of at least one synchronization parameter.

5. A method of maintaining synchronization configuration status information in a synchronization network that includes a first node and second node, the method comprising:

periodically sending a first "Sync Hello" packet from the first node to the second node, wherein the first "Sync Hello" packet includes most recent information about synchronization status of the first node;

periodically sending a second "Sync Hello" packet from the second node to the first node, wherein the second "Sync Hello" packet includes most recent information about synchronization status of the second node;

detecting in the first node, a failure of a synchronization link between the first node and a primary synchronization source for the first node; and sending a "Sync Link State Update" packet from the first node to the second node, wherein the "Sync Link State Update" packet includes information about the failure of the synchronization link between the first node and the primary synchronization source for the first node.

6. The method of claim 5, further comprising:

in response to receipt of the "Sync Link State Update" packet in the second node, sending a "Sync Link State Acknowledgment" packet from the second node to the first node.

7. The method of claim 5, further comprising:

initializing a third node in the synchronization network, said initializing step including sending a "Sync Link State Request" packet from the third node to the first node to update the synchronization configuration status information for the synchronization network.

8. The method of claim 7, further comprising:

in response to receipt of the "Sync Link State Request" packet from the third node, sending a "Sync Link State Update" packet from the first node to the third node, wherein the "Sync Link State Update" packet includes information about the synchronization status of the first node.

9. The method of claim 8, further comprising:

in response to receipt of the "Sync Link State Update" packet in the third node, sending a "Sync Link State Acknowledgment" packet from the third node to the first node.

10. A method of configuring a first node in a synchronization network, the method comprising:

sending a configuration packet from a central management network node to the first node, wherein the configuration packet includes one or more synchronization configuration commands;

in the first node, carrying out the one or more synchronization configuration commands, and generating therefrom an updated synchronization status for the first node;

sending a "Sync Link State Update" packet from the first node to the central management network node, wherein the "Sync Link State Update" packet includes the updated synchronization status for the first node; and in response to receipt of the "Sync Link State Update" packet in the central management network node, sending a "Sync Link State Acknowledge" packet from the central management network node to the first node acknowledging receipt of the updated synchronization status for the first node.

11. A method of updating a database in a first node in a synchronization network, the method comprising:
   populating the database in the first node with synchronization information for the first node;
   sending a "Sync Hello" packet from the first node to a second node in the synchronization network, said "Sync Hello" packet including information about the synchronization status of the first node;
   in response to receipt of the "Sync Hello" packet in the second node:
      updating a database in the second node with the information about the synchronization status of the first node; and
      sending a first "Sync Database Description" packet from the second node to the first node, wherein the first "Sync Database Description" packet includes information about the synchronization status of the second node; and
   in the first node, updating the database with the information about the synchronization status of the second node.

12. The method of claim 11, further comprising:
   acknowledging receipt of the first "Sync Database Description" packet in the first node by sending a second "Sync Database Description" packet from the first node to the second node.

13. An apparatus for operating a synchronization network that comprises a plurality of nodes and logic that distributes reference clocks to each node in the synchronization network, the apparatus comprising:
   at each of the nodes, logic that stores a table that includes a most recent status of the synchronization network, said network synchronization status including, for all of the nodes in the network, information indicating a primary synchronization reference for each node, whether each node has one or more secondary synchronization references, a priority indication for each of the synchronization references for each node, a succession of nodes through which each synchronization reference can be traced from each node to the reference, and an indication of which reference is currently being used by each node;
   logic that detects a change in synchronization status at a first node in the synchronization network;
   at the first node, logic that updates the table to represent a first updated status of the synchronization network; and
   logic that uses a synchronization network management protocol to distribute the first updated status from the first node to other nodes in the synchronization network.

14. The apparatus of claim 13, further comprising:
   at a second node in the synchronization network, logic that changes the synchronization information for the second node in response to receiving the first updated status generated by the first node;
   at the second node, logic that updates the table to include a second updated status of the synchronization network; and
   logic that uses the synchronization network management protocol to distribute the second updated status from the second node to other nodes in the synchronization network.

15. The apparatus of claim 13, further comprising:
   logic that receives the first updated status in an integrated synchronization network management network node;
   logic in the integrated synchronization network management network node that generates one or more synchronization network control commands in response to the first updated status; and
   logic that uses the synchronization network management protocol to distribute the one or more synchronization network control commands from the integrated synchronization network management network node to one or more targeted nodes in the synchronization network.

16. The apparatus of claim 13, wherein the table includes a supervision result for each node in the network, said supervision result indicating a quality level of at least one synchronization parameter.

17. An apparatus for maintaining synchronization configuration status information in a synchronization network that includes a first node and a second node, the apparatus comprising:
   logic that periodically sends a first "Sync Hello" packet from the first node to the second node, wherein the first "Sync Hello" packet includes most recent information about synchronization status of the first node;
   logic that periodically sends a second "Sync Hello" packet from the second node to the first node, wherein the second "Sync Hello" packet includes most recent information about synchronization status of the second node;
   logic in the first node that detects a failure of a synchronization link between the first node and a primary synchronization source for the first node; and
   logic that sends a "Sync Link State Update" Packet from the first node to the second node, wherein the "Sync Link State Update" Packet includes information about the failure of the synchronization link between the first node and the primary synchronization source for the first node.

18. The apparatus of claim 17, further comprising:
   logic in the second node that sends a "Sync Link State Acknowledgment" packet from the second node to the first node in response to receipt of the "Sync Link State Update" packet by the second node.

19. The apparatus of claim 17, further comprising:
   logic in a third node in the synchronization network that initializes the third node, including sending a "Sync Link State Request" packet from the third node to the first node to update the synchronization configuration status information for the synchronization network.

20. The apparatus of claim 19, further comprising:
   logic in the first node that sends a "Sync Link State Update" packet from the first node to the third node in response to receipt of the "Sync Link State Request" packet from the third node, wherein the "Sync Link State Update" packet includes information about the synchronization status of the first node.

21. The apparatus of claim 20, further comprising:
   logic in the third node that sends a "Sync Link State Acknowledgment" packet from the third node to the first node in response to receipt of the "Sync Link State Update" packet in the third node.

22. An apparatus for configuring a first node in a synchronization network, the apparatus comprising:
   logic in a central management network node that sends a configuration packet from the central management network node to the first node, wherein the configuration packet includes one or more synchronization configuration commands;

in the first node, logic that carries out the one or more synchronization configuration commands, and generates therefrom an updated synchronization status for the first node;

logic that sends a "Sync Link State Update" packet from the first node to the central management network node, wherein the "Sync Link State Update" packet includes the updated synchronization status for the first node; and logic in the central management network node that sends a "Sync Link State Acknowledge" packet from the central management network node to the first node acknowledging receipt of the updated synchronization status for the first node in the "Sync Link State Update" packet.

23. An apparatus for updating a database in a first node in a synchronization network, the apparatus comprising:

logic in the first node that populates the database in the first node with synchronization information for the first node;

logic that sends a "Sync Hello" packet from the first node to a second node in the synchronization network, said "Sync Hello" packet including information about the synchronization status of the first node;

logic in the second node that updates a database in the second node with the information about the synchronization status of the first node and sends a first "Sync Database Description" packet from the second node to the first node in response to receipt of the "Sync Hello" packet, wherein the first "Sync Database Description" packet includes information about the synchronization status of the second node; and in the first node, logic that updates the database with the information about the synchronization status of the second node.

24. The apparatus of claim 23, further comprising:

logic in the first node that acknowledges receipt of the first "Sync Database Description" packet in the first node by sending a second "Sync Database Description" packet from the first node to the second node.

\* \* \* \* \*